(12) United States Patent
Park et al.

(10) Patent No.: US 9,135,187 B2
(45) Date of Patent: Sep. 15, 2015

(54) APPARATUS AND METHOD FOR PROTECTING MEMORY IN MULTI-PROCESSOR SYSTEM

(75) Inventors: Jung Keun Park, Seoul (KR); Jeong Joon Yoo, Yongin-si (KR); Seung Won Lee, Hwaseong-si (KR); Shi Hwa Lee, Seoul (KR); Chae Seok Im, Suwon-si (KR)

(73) Assignees: Samsung Electronics Co., Ltd., Suwon-si (KR); Konkuk University Industrial Cooperation Corp., Seoul (KR)

( * ) Notice: Subject to any disclaimer, the term of this patent is extended or adjusted under 35 U.S.C. 154(b) by 233 days.

(21) Appl. No.: 13/353,784

(22) Filed: Jan. 19, 2012

(65) Prior Publication Data

US 2012/0198206 A1 Aug. 2, 2012

(30) Foreign Application Priority Data

Jan. 31, 2011 (KR) ........................ 10-2011-0009676

(51) Int. Cl.
*G06F 12/00* (2006.01)
*G06F 9/26* (2006.01)
*G06F 9/34* (2006.01)
*G06F 12/14* (2006.01)

(52) U.S. Cl.
CPC .................................. *G06F 12/1441* (2013.01)

(58) Field of Classification Search
CPC  G06F 12/1036; G06F 9/30101; G06F 12/109
USPC .......................................................... 711/206
See application file for complete search history.

(56) References Cited

U.S. PATENT DOCUMENTS

| 4,851,989 | A | * | 7/1989 | Kagimasa et al. ............ 711/206 |
| 2004/0088566 | A1 | * | 5/2004 | Chou et al. .................... 713/200 |
| 2006/0004795 | A1 | * | 1/2006 | Shah et al. .................... 707/100 |
| 2008/0271014 | A1 | * | 10/2008 | Serebrin et al. ................... 718/1 |
| 2009/0307434 | A1 | | 12/2009 | Sivaramakrishnan et al. |

FOREIGN PATENT DOCUMENTS

| JP | 4246204 | 1/2009 |
| KR | 10-0881810 | 1/2009 |
| KR | 10-2010-0034591 | 4/2010 |

OTHER PUBLICATIONS

ARM, ARM740T Datasheet, ARM DDI 0008E, Feb. 1998, 151 pages.
ARM, ARM11 MPCore Processor Technical Reference Manual, Revision r2p0, ARM DDI 0360F, Oct. 2008; 728 pages.
Freescale, MSC8144 Reference Manual, MSC8144RM, Jun. 2009, 1166 pages.
Intel, Intel architecture software developer's manual, vol. 3: System programming, 1999, 658 pages.

* cited by examiner

*Primary Examiner* — Charles Rones
*Assistant Examiner* — Sidney Li
(74) *Attorney, Agent, or Firm* — NSIP Law

(57) ABSTRACT

Memory mapping in small units using a segment and subsegments is described, and thus it is possible to control a memory access even using a small amount of hardware, and it is possible to reduce costs incurred by hardware. Additionally, it is possible to prevent a memory from being destroyed due to a task error in the multi-processor system.

11 Claims, 7 Drawing Sheets

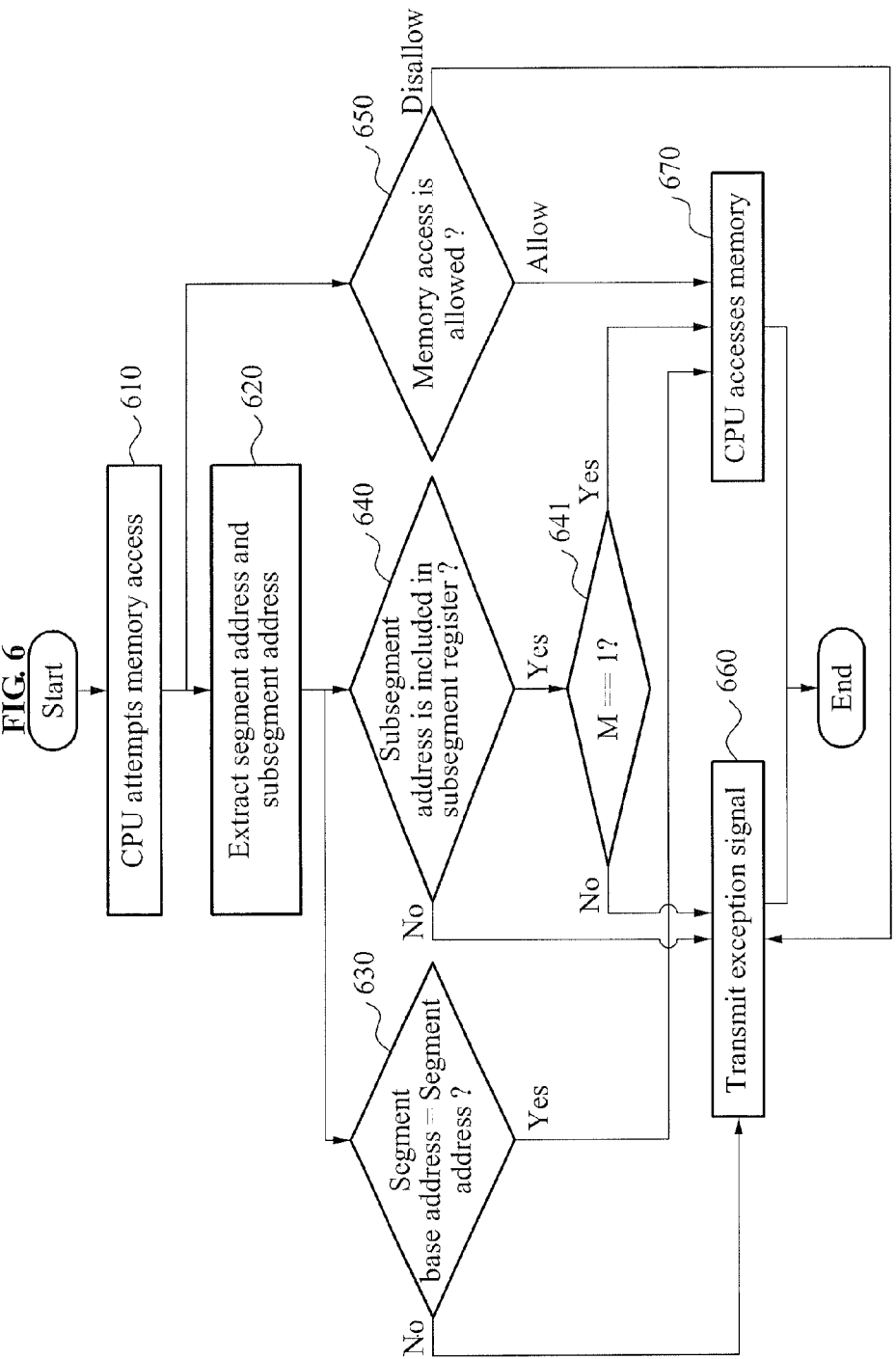

APPARATUS AND METHOD FOR PROTECTING MEMORY IN MULTI-PROCESSOR SYSTEM

CROSS-REFERENCE TO RELATED APPLICATIONS

This application claims the priority benefit of Korean Patent Application No. 10-2011-0009676, filed on Jan. 31, 2011, in the Korean Intellectual Property Office, the disclosure of which is incorporated herein by reference.

BACKGROUND

1. Field

Example embodiments of the following description provide a memory protection apparatus and method in a multi-processor system, and more particularly, to a memory protection apparatus and method that may restrict a memory access of each processor with respect to a shared memory in a multi-processor system.

2. Description of the Related Art

A conventional memory protection technology is broadly classified into a Memory Management Unit (MMU)-based scheme and a segment-based scheme. In the MMU-based scheme, a memory may be divided into pages of equal size, and may be managed. Additionally, the MMU may describe, in a page table, mapping of a logical address and a physical address, and may perform address translation based on the mapping. When the mapping is not performed, or an access right is violated during the address translation, the MMU may notify a Central Processing Unit (CPU) that the mapping is not performed or that the access right is violated. When address translation is performed based on a page table located in a memory, memory access is attempted several times in order to perform a single memory access. In the MMU, to quickly perform the address translation, a cache for a page table, called a Translation Lookaside Buffer (TLB), may be maintained. Since the TLB enables a fast access, differently from a Dynamic Random Access Memory (DRAM), an implementation overhead caused by the address translation may be reduced.

However, the MMU-based scheme is not suitable for an embedded multi-processor system. First, complex hardware logic is required for the MMU and the TLB. Additionally, to maintain the page table, a separate memory is required. In the embedded multi-processor system, each CPU has its fast local memory. However, it is difficult to maintain the page table due to the small size of each fast local memory. Additionally, when the page table is placed in a shared DRAM, and when there is no separate hardware, such as a TLB, it is difficult to achieve a high performance. Such hardware needs to be realized for each of the multiple cores and accordingly, overhead may be increased, as the number of cores is increased.

SUMMARY

The foregoing and/or other aspects are achieved by providing a memory protection method including extracting a segment address and a subsegment address from a memory address corresponding to a memory access, when a Central Processing Unit (CPU) attempts the memory access with respect to a memory, comparing the extracted segment address with a segment base address, and when the segment base address is different from the extracted segment address, transmitting an exception signal to the CPU, the segment base address being included in a segment register, and the exception signal indicating that the memory access is disallowed, and determining whether the subsegment address is included in a subsegment register, and when the subsegment address is not included in the subsegment register, transmitting the exception signal to the CPU.

The foregoing and/or other aspects are achieved by providing a memory protection apparatus including a subsegment register including a plurality of subsegment addresses, a segment register including a segment base address, and a Memory Protection Unit (MPU) to determine whether a memory access is allowed, based on the segment register and the subsegment register when a CPU attempts the memory access with respect to a memory, and to transmit an exception signal to the CPU when the memory access is disallowed, the exception signal indicating that the memory access is disallowed.

The foregoing and/or other aspects are achieved by providing a computer system including a memory protection apparatus. The memory protection apparatus includes an extractor to extract a segment address and a subsegment address from a memory address corresponding to a memory access, a comparator to compare the extracted segment address with a segment base address. The memory protection apparatus also includes a transmitter to transmit an exception signal to a CPU to indicate that memory access is disallowed, if an exception condition exists. Examples of exception conditions include, but are not limited to, the segment base address being different from the extracted segment address or the subsegment address not being included in a subsegment register.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 6 illustrates a flowchart of a memory protection method according to example embodiments.

DETAILED DESCRIPTION

Figure 1:
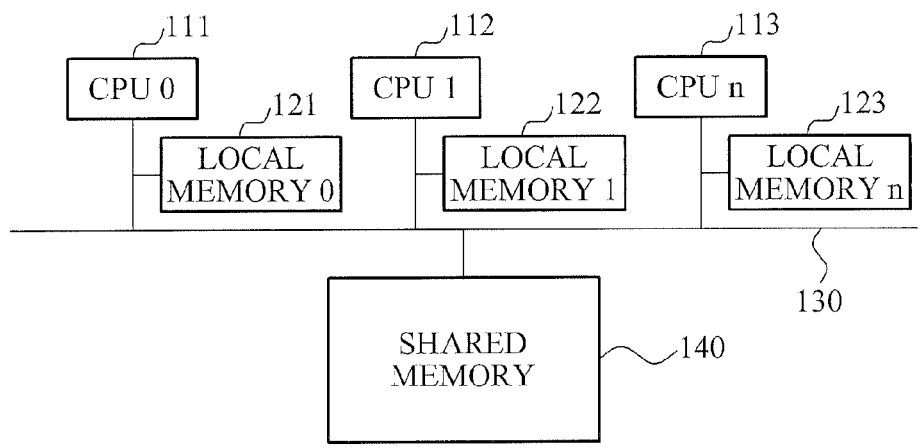
FIG. 1 illustrates a block diagram of a configuration of a multi-processor system according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a block diagram of a configuration of a multi-processor system according to example embodiments.

Referring to FIG. 1, in the multi-processor system, data may be transmitted and received through a plurality of Central Processing Units (CPUs) 111, 112, and 113. Here, the plurality of CPUs 111, 112, and 113 may share a shared memory 140.

The shared memory 140 may include, for example, a Dynamic Random Access Memory (DRAM). The DRAM may have a large capacity, however, may be operated at a relatively low speed. The plurality of CPUs 111, 112, and 113 may access the DRAM via a bus 130. For example, when the plurality of CPUs 111, 112, and 113 simultaneously access the DRAM, the plurality of CPUs 111, 112, and 113 may collide with each other.

Accordingly, to quickly access memory, the plurality of CPUs 111, 112, and 113 may maintain Scratch Pad Memories (SPMs) as local memories 121, 122, and 123 of FIG. 1.

In a general multi-processor system, a number of times to access the DRAM may be reduced through a local cache. However, compared to the local cache, an SPM may control memory contents using an application program and, accordingly, the memory contents may be maintained in a manner suitable for the application program.

However, the SPM may have a small size, for example, several hundreds of kilobytes (KB). Accordingly, effective loading of data required for the SPM may have a great influence on the performance of the multi-processor system.

Hereinafter, in a memory protection apparatus and method according to example embodiments, an operation of restricting a memory access attempted by the plurality of CPUs 111, 112, and 113 with respect to the shared memory 140 will be further described.

Figure 2:
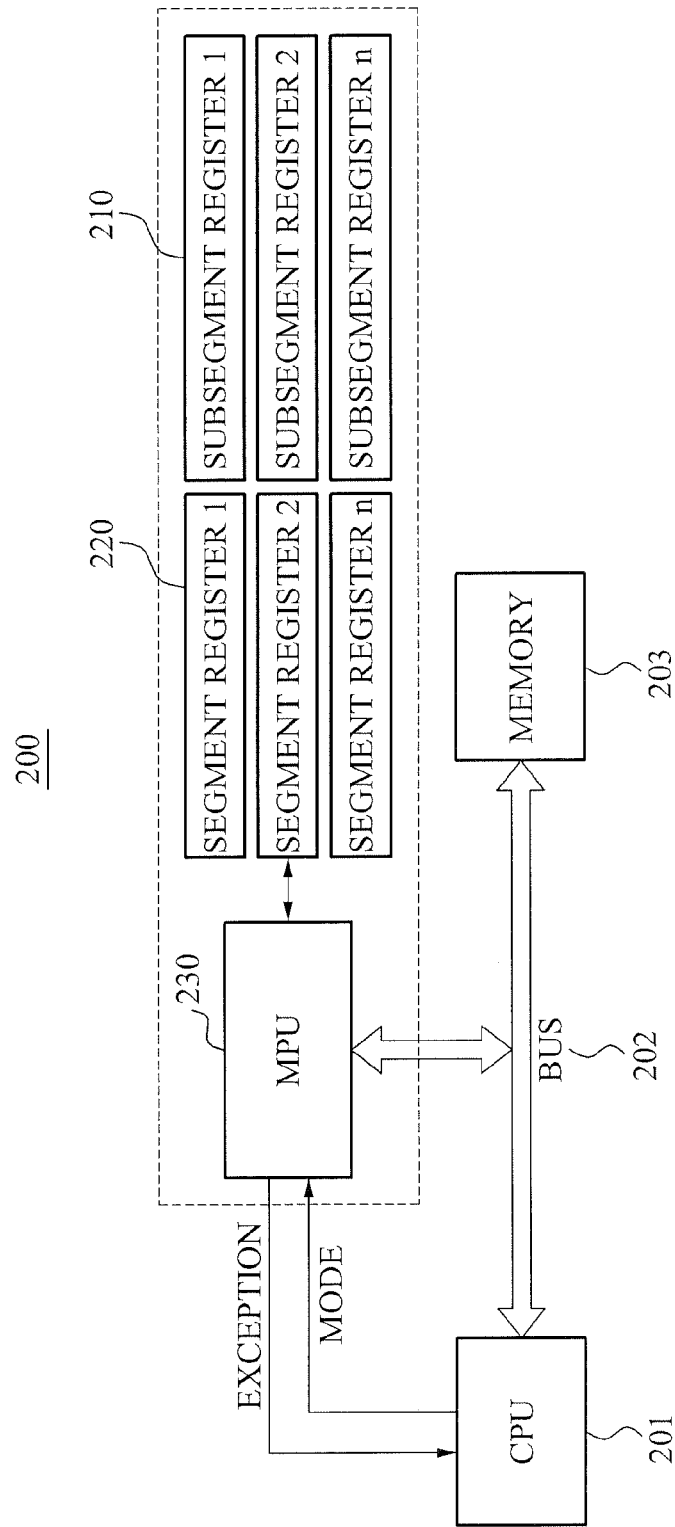
FIG. 2 illustrates a block diagram of a configuration of a memory protection apparatus according to example embodiments.

FIG. 2 illustrates a block diagram of a configuration of a memory protection apparatus 200 according to example embodiments.

Referring to FIG. 2, the memory protection apparatus 200 may include a subsegment register 210, a segment register 220, and a Memory Protection Unit (MPU) 230.

The subsegment register 210 may include a plurality of subsegment addresses.

The segment register 220 may include a segment base address.

According to an aspect, the memory protection apparatus 200 may set an entire region of the memory 203, based on a segment. More specifically, the memory protection apparatus 200 may set, in the segment register 220, a boundary of the entire region of the memory 203, and an access right of a CPU 201 with respect to the memory 203.

According to an aspect, the memory protection apparatus 200 may set detailed regions of the memory 203, based on a subsegment. More specifically, the memory protection apparatus 200 may divide a memory region corresponding to a single segment into a plurality of subsegments of equal size. Here, the memory protection apparatus 200 may display information indicating whether a subsegment is a mapped region, in a segment in the form of a bitmap.

The MPU 230 may monitor a bus 202, and may determine whether the CPU 201 attempts a memory access with respect to the memory 203.

When the CPU 201 attempts the memory access with respect to the memory 203, the MPU 230 may determine whether the CPU 201 has an access right to the memory 203. When the CPU 201 attempts to access an unmapped memory region, or to a memory region that the CPU 201 is unauthorized to access, the MPU 230 may transmit, to the CPU 201, an exception signal indicating that the memory access is disallowed.

Additionally, when the CPU 201 attempts the memory access with respect to the memory 203, the MPU 230 may determine whether the memory access is allowed, based on the segment register 220 and the subsegment register 210. More specifically, the MPU 230 may determine whether the memory access is allowed, based on information regarding a memory region that is included in the segment register 220 and the subsegment register 210.

When the memory access is disallowed, the MPU 230 may transmit, to the CPU 201, an exception signal indicating a denial of access to the memory 203.

According to an aspect, the MPU 230 may extract a segment address from a memory address corresponding to the memory access attempted by the CPU 201.

Additionally, the MPU 230 may compare the extracted segment address with the segment base address included in the segment register 220.

When the segment base address is different from the extracted segment address, the MPU 230 may transmit the exception signal to the CPU 201.

According to an aspect, the MPU 230 may extract a subsegment address corresponding to the memory access from the memory address corresponding to the memory access.

Additionally, the MPU 230 may determine whether the extracted subsegment address is included in the subsegment register 210.

When the extracted subsegment address is not included in the subsegment register 210, the MPU 230 may transmit the exception signal to the CPU 201.

When the extracted subsegment address is included in the subsegment register 210, the MPU 230 may determine whether the extracted subsegment address is mapped, based on a map bit included in the segment register 220. When the extracted subsegment address is unmapped, the MPU 230 may transmit the exception signal to the CPU 201.

According to an aspect, the MPU 230 may determine whether the memory access is allowed, based on a protection bit included in the segment register 220.

Here, the protection bit may include information on an access right of the CPU 201 with respect to the memory 203.

The access right to the memory 203 may be set based on a CPU mode where the CPU 201 is running. The CPU mode may include, for example, a user mode, and a supervisor mode.

Table 1 shows examples of an access right to a memory for each CPU, and a protection bit associated with the access right, as below.

TABLE 1

| P[2:1] | Permission | User | Supervisor |
| --- | --- | --- | --- |
| 00 | No permission | X | X |
| 01 | Supervisor only | X | Read/Write |
| 10 | User read-only | Read | Read/Write |
| 11 | User read/write | Read/Write | Read/Write |

When the memory access is disallowed, the MPU 230 may transmit the exception signal to the CPU 201.

According to an aspect, a number of segment registers 220, and a number of subsegment registers 210 may be set based on the memory protection apparatus 200.

Figure 3A:
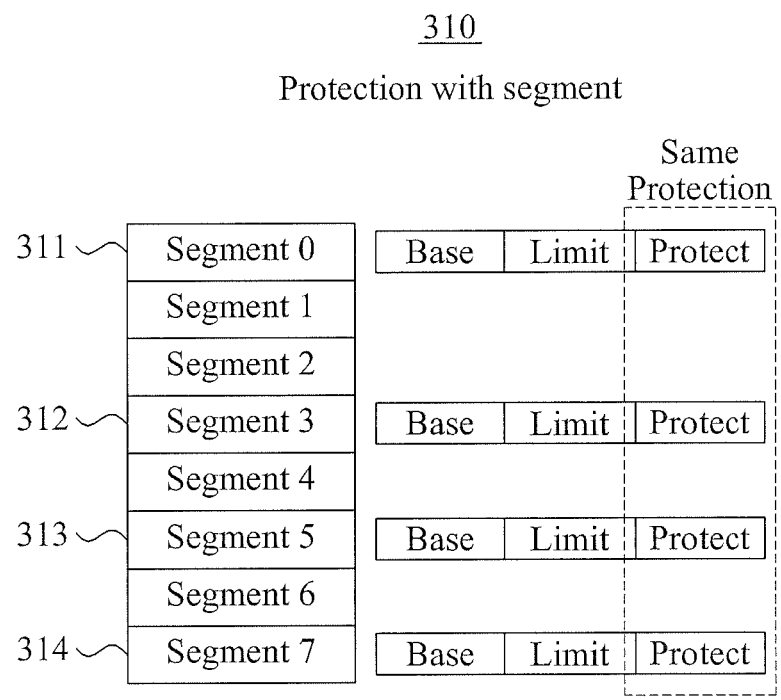
FIGS. 3A and 3B illustrate diagrams of examples of mapping relationships in multi-processor systems.
Figure 3B:
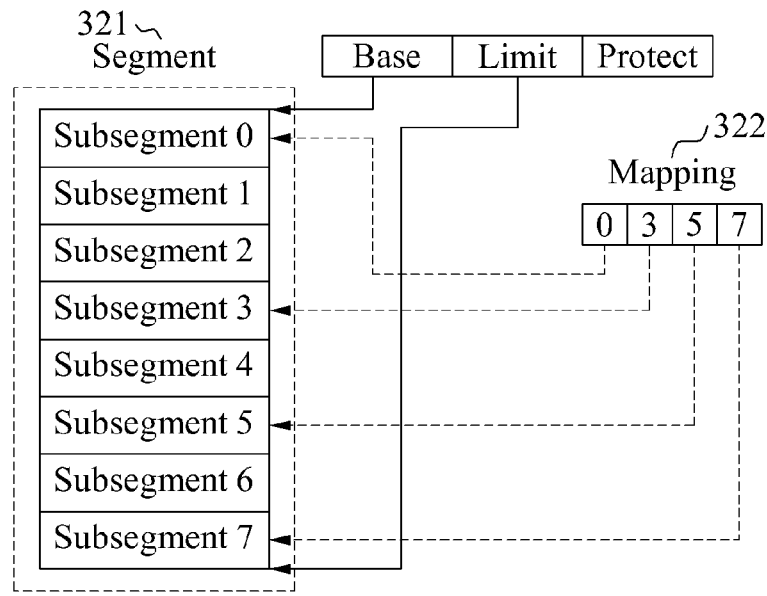

FIGS. 3A and 3B illustrate diagrams of examples of mapping relationships in multi-processor systems.

Specifically, FIG. 3A illustrates a mapping relationship 310 in a conventional multi-processor system using only segments. When a memory is discontinuously mapped as shown in FIG. 3A, a segment register needs to be allocated to each region of the memory. Accordingly, a plurality of segment registers may be required. For example, four segment registers 311, 312, 313, and 314 may be used.

FIG. 3B illustrates a mapping relationship 320 in a multi-processor system according to example embodiments where both segments and subsegments are used. As shown in FIG. 3B, when subsegments are used, only information 322 regarding whether mapping is performed on a subsegment may need to be displayed by a bitmap in a segment region. Accordingly, a number of segment registers used may be reduced. In other words, only a single segment 321 may be used.

In particular, in the multi-processor system, when mapping is performed on an address of regular size, similarly to an SPM, an access right to another SPM may be mapped via a subsegment. Additionally, in a memory region of a DRAM, it is possible to effectively control a memory access for each subsegment, in connection with a memory allocator.

Figure 4:
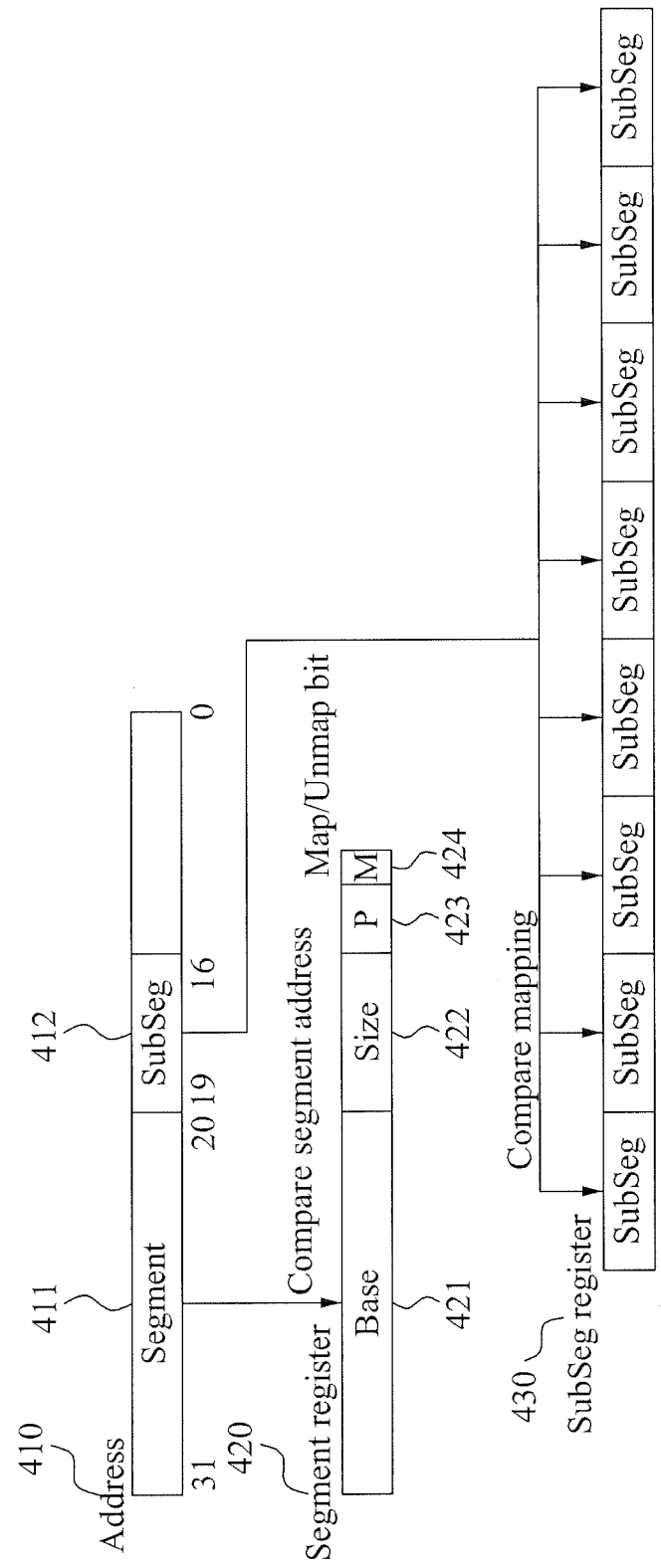
FIG. 4 illustrates a diagram of a configuration of a segment register, and a configuration of a subsegment register according to example embodiments.

FIG. 4 illustrates a diagram of a configuration of a segment register, and a configuration of a subsegment register according to example embodiments.

Referring to FIG. 4, a memory address 410 may include a segment address 411, and a subsegment address 412.

Additionally, a segment register 420 may include a segment base address 421. Depending on example embodiments, the segment register 420 may further include a segment size 422, a protection bit 423, and a bitmap 424. Here, the bitmap 424 may indicate whether a subsegment address is mapped.

A memory protection apparatus according to example embodiments may extract the segment address 411 from the memory address 410, and may compare the extracted segment address 411 with the segment base address 421. More specifically, the memory protection apparatus may determine whether a CPU attempts to access a memory region corresponding to the segment register 420, by comparing the segment address 411 with the segment base address 421.

Additionally, a subsegment register 430 may display addresses obtained when a segment is divided into 16 equal parts. For example, when a segment has a size of 1 Megabyte (MB), a subsegment may have a size of 64 KB, obtained by dividing 1024 KB by 16. Accordingly, in a memory address of the segment register 420, bits from a 16$^{th}$ bit to a 19$^{th}$ bit may correspond to the subsegment address 412.

Depending on example embodiments, each subsegment may include a memory address of 4 bits. Since 16 subsegments are included in a segment, a space of 64 bits, or 8 bytes, obtained by multiplying 4 bits by 16 subsegments, may be used to indicate a mapping relationship of the 16 subsegments.

Additionally, since subsegments may be mapped or unmapped, a number of subsegments that are either mapped or unmapped may be equal to or less than "8". Accordingly, a bit M may be used to indicate whether a subsegment is either a mapped region or an unmapped region. For example, a bit M having a value of "1" may indicate a mapped region, and a bit M having a value of "0" may indicate an unmapped region. Here, when an address of a subsegment corresponding to the subsegment register 430 is represented, all of the subsegments may be represented by 32 bits in total.

The memory protection apparatus may compare the subsegment address 412 of the memory address 410 with eight subsegment addresses included in the subsegment register 430, and may determine whether the subsegment address 412 is mapped.

Accordingly, the memory protection apparatus may compare the segment address 411 of the memory address 410 with the segment base address 421 of the segment register 420, may compare the subsegment address 412 of the memory address 410 with the eight subsegment addresses included in the subsegment register 430, and may determine whether the memory address 410 is available to access a memory.

TABLE 2

Segment base address 421 = 1111 1111 1001 0000 0000 0000 0000 0000
Segment size 422 = 1 MB
Subsegment mapping M 424 = 1
Subsegment register 430 = 0000 0001 0010 0011 1000 1001 1000 1111

For example, assuming that the segment base address 421, the segment size 422, the bitmap 424, and the subsegment addresses included in the subsegment register 430 are set as shown in Table 2 above, when the memory address 410 corresponds to "1111 1111 1001 0010 1111 1010 1100 0000", the memory address 410 may indicate an address mapped by a segment. In other words, since the segment address 411 of the memory address 410 corresponds to "1111 1111 1001", the segment address 411 may be identical to a front portion of the segment base address 421, and the subsegment address 412 corresponding to "0010" may be included in the subsegment register 430. Additionally, since the subsegment represents a mapping relationship "M=1", the memory address 410 may indicate the address mapped by the segment.

Figure 5:
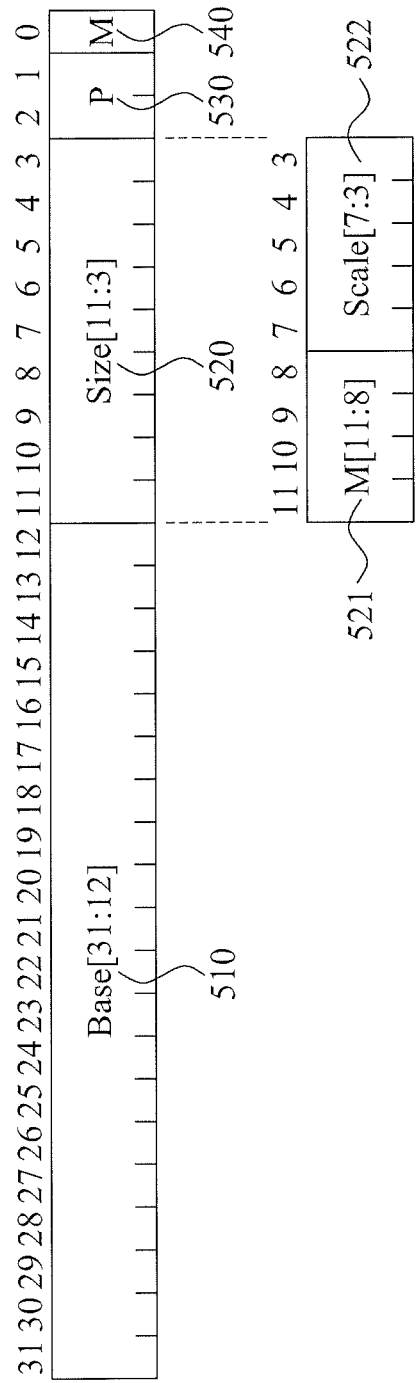
FIG. 5 illustrates a diagram of encoding of a segment register according to example embodiments.

FIG. 5 illustrates a diagram of encoding of a segment register 500 according to example embodiments.

Referring to FIG. 5, the segment register 500 may include a segment base address 510.

Additionally, the segment register 500 may further include a segment size 520, a protection bit 530, and a bitmap 540. Here, the bitmap 540 may indicate whether a subsegment address is mapped.

The segment size 520 may include a size value 521, and a scale value 522. Depending on example embodiments, a size of a segment may be calculated as a value of "M×2^scale", and may be set in a range of "0" to "4G".

The protection bit 530 may store information on an access right of a CPU with respect to a memory.

The bitmap 540 may store information regarding whether a subsegment is a mapped address.

FIG. 6 illustrates a flowchart of a memory protection method according to example embodiments.

Referring to FIG. 6, in operation 610, a bus may be monitored, and a CPU may attempt a memory access with respect to a memory.

When the CPU attempts the memory access with respect to the memory, a segment address and a subsegment address may be extracted from a memory address corresponding to the memory access in operation 620.

In operation 630, the extracted segment address may be compared with a segment base address included in a segment register.

When the segment base address is different from the extracted segment address, an exception signal may be transmitted to the CPU in operation 660.

When the segment base address is identical to the extracted segment address, the CPU may access the memory in operation 670.

In operation 640, whether the extracted subsegment address is included in a subsegment register may be determined.

When the extracted subsegment address is not included in the subsegment register, the exception signal may be transmitted to the CPU in operation 660.

When the extracted subsegment address is included in the subsegment register, whether the extracted subsegment address is mapped may be determined based on a map bit "M" included in the segment register in operation 641.

When the extracted subsegment address is unmapped, the exception signal may be transmitted to the CPU in operation 660.

When the extracted subsegment address is mapped, the CPU may access the memory in operation 670.

In operation 650, whether the memory access is allowed may be determined based on a protection bit included in the segment register.

Here, the protection bit may include information on an access right of the CPU with respect to the memory.

The access right to the memory may be set based on a CPU mode where the CPU is running. The CPU mode may include, for example, a user mode, and a supervisor mode.

When the memory access is disallowed, the exception signal may be transmitted to the CPU in operation 660.

When the memory access is allowed, the CPU may access the memory in operation 670.

Depending on example embodiments, operations 630, 640, and 650 may be performed sequentially, or in parallel.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A memory protection method, comprising:
    extracting a segment address and a subsegment address from a memory address of a memory access, when a Central Processing Unit (CPU) attempts the memory access with respect to a memory;
    comparing the extracted segment address with a segment base address comprised in a segment register, the segment base address being of a segment of the memory;
    transmitting an exception signal to the CPU when the extracted segment address is different from the segment base address, the exception signal indicating that the memory access is disallowed;
    determining whether the extracted subsegment address matches any of one or more subsegment addresses comprised in a subsegment register corresponding to the segment base address, the one or more subsegment addresses being of one or more subsegments of the segment;
    transmitting the exception signal to the CPU when the extracted subsegment address does not match any of the one or more subsegment addresses;
    determining whether the extracted subsegment address is mapped based on a map bit comprised in the segment register, when the extracted subsegment address matches any one of the one or more subsegment addresses; and
    transmitting the exception signal to the CPU when the extracted subsegment address is unmapped.

2. The memory protection method of claim 1, further comprising:
    determining whether the memory access is allowed, based on a protection bit comprised in the segment register; and
    when the memory access is disallowed, transmitting the exception signal to the CPU.

3. The memory protection method of claim 2, wherein the protection bit comprises information on an access right with respect to the memory.

4. A non-transitory computer readable recording medium storing a program to cause a computer to implement the method of claim 1.

5. A memory protection apparatus, comprising:
    a subsegment register comprising one or more subsegment addresses, the one or more subsegment addresses being of one or more subsegments of a segment of a memory;
    a segment register comprising a segment base address and a map bit, the segment base address being of the segment; and
    a Memory Protection Unit (MPU) configured to
        extract a segment address and a subsegment address from a memory address Of a memory access, when a Central Processing Unit (CPU) attempts the memory access with respect to the memory,
        compare the extracted segment address with the segment base address,
        transmit an exception signal to the CPU when the extracted segment address is different from the segment base address, the exception signal indicating that the memory access is disallowed,
        determine whether the extracted subsegment address matches any of the one or more subsegment addresses,
        transmit the exception signal to the CPU when the extracted subsegment address does not match any of the one or more subsegment addresses,
        determine whether the extracted subsegment address is mapped based on the map bit when the extracted subsegment address matches any one of the one or more subsegment addresses, and
        transmit the exception signal to the CPU when the extracted subsegment address is unmapped.

6. The memory protection apparatus of claim 5, wherein the MPU is configured to:
    determine whether the memory access is allowed, based on a protection bit comprised in the segment register; and
    when the memory access is disallowed, transmit the exception signal to the CPU.

7. The memory protection method of claim 1, wherein the one or more subsegments are of equal size contiguously arranged within the segment.

8. The memory protection method of claim 7, wherein:
the subsegment register comprises subsegment addresses, the subsegment addresses being of subsegments of the segment; and
a number of bits used for each of the subsegment addresses is equal to n such that $2^n$ equals a total number of the subsegments.

9. The memory protection apparatus of claim 5, wherein the one or more subsegments are of equal size contiguously arranged within a segment corresponding to the segment base address.

10. The memory protection apparatus of claim 9, wherein a number of bits used for each of the one or more subsegment addresses is equal to n such that $2^n$ equals a total number of the one or more subsegments.

11. The memory protection method of claim 9, wherein:
the subsegment register comprises subsegment addresses, the subsegment addresses being of subsegments of the segment; and
a number of bits used for each of the subsegment addresses is equal to n such that $2^n$ equals a total number of the subsegments.

* * * * *